United States Patent
Sawada et al.

(10) Patent No.: US 7,003,787 B2
(45) Date of Patent: Feb. 21, 2006

(54) URGING STRUCTURE FOR AN OUTPUT SHAFT OF A DRIVE MOTOR

(75) Inventors: Nobutaka Sawada, Saitama (JP); Jun Togashi, Saitama (JP); Hideki Kinoshita, Saitama (JP); Takashi Mizoguchi, Saitama (JP); Akira Yasaki, Saitama (JP)

(73) Assignee: Pioneer Corporation, Tokyo (JP)

( * ) Notice: Subject to any disclaimer, the term of this patent is extended or adjusted under 35 U.S.C. 154(b) by 321 days.

(21) Appl. No.: 10/165,977

(22) Filed: Jun. 11, 2002

(65) Prior Publication Data

US 2002/0191529 A1    Dec. 19, 2002

(30) Foreign Application Priority Data

Jun. 15, 2001    (JP)    ............... P.2001-181742

(51) Int. Cl.
G11B 7/09    (2006.01)
G11B 21/02    (2006.01)

(52) U.S. Cl. ............ 720/659; 369/223; 310/67 R
(58) Field of Classification Search ........... 369/223, 369/219, 215, 220; 360/261.3, 261.1, 260; 384/610, 619; 310/90, 49 R, 67 R
See application file for complete search history.

(56) References Cited

U.S. PATENT DOCUMENTS

| 3,848,477 | A |   | 11/1974 | Giandinoto et al. |
| 4,030,137 | A | * | 6/1977 | Dalziel ................ 360/261.3 |
| 4,621,933 | A | * | 11/1986 | Musso ...................... 400/555 |
| 4,792,245 | A | * | 12/1988 | Fuke et al. ............... 384/610 |
| 5,811,903 | A | * | 9/1998 | Ueno et al. ................. 310/90 |
| 5,886,438 | A |   | 3/1999 | Kawanishi |
| 6,052,358 | A | * | 4/2000 | Morikawa et al. ........ 369/219 |
| 6,208,046 | B1 | * | 3/2001 | Lee ........................ 310/49 R |
| 6,590,849 | B1 | * | 7/2003 | Yamauchi et al. ......... 720/607 |

FOREIGN PATENT DOCUMENTS

| DE | 27 14 332 A1 | 10/1978 |
| DE | 28 09 390 A1 | 9/1979 |
| EP | 1 035 632 A1 | 9/2000 |
| EP | 1 041 698 A2 | 10/2000 |
| GB | 2 147 728 A | 5/1985 |
| JP | 6-133490 A | 5/1994 |

* cited by examiner

*Primary Examiner*—Angel Castro
(74) *Attorney, Agent, or Firm*—Sughrue Mion, PLLC

(57)    ABSTRACT

An urging structure for an output shaft of a drive motor of the invention is configured by a pressing plate 31 which abuts against an end face 24a of an output shaft 24, and an urging spring 36 which urges the pressing plate in the axial direction of the output shaft 24. In the pressing plate 31, a fixing portion 32 in one end is fixed onto a chassis 21 in the vicinity of the output shaft 24, and an abutting portion 34 is disposed on the tip end of a flexible arm portion 33. A spring holding portion 35 with which an end portion of the urging spring 36 that is fixed to a spring boss 37 is to be engaged is disposed on the rear face of the abutting portion 34.

3 Claims, 4 Drawing Sheets

URGING STRUCTURE FOR AN OUTPUT SHAFT OF A DRIVE MOTOR

BACKGROUND OF THE INVENTION

1. Field of the Invention

The present invention relates to an urging structure for an output shaft of a drive motor, and more particularly to an urging structure for an output shaft of a small drive motor such as a carriage motor which is used for driving a pickup of a CD player.

2. Description of the Related Art

In a conventional CD player, as shown in FIG. 6, a turn table 2, a carriage 3, and the like are disposed on a chassis 1. The carriage 3 holds an objective lens 7 of a pickup in a center area thereof, and is placed in a center opening 1a of the chassis 1 so as to be movable in the anteroposterior direction (the direction along which the carriage approaches or separates from the turn table, and which corresponds to the vertical direction in the figure).

Guide shafts 8 and 9 serving as guide members for guiding the carriage 3 in the anteroposterior direction are disposed on both sides (the left and right sides in the figure) of the movement space for the carriage in the center opening 1a of the chassis 1. One of the guide shafts, i.e., the guide shaft 8 is configured by a round bar. The other guide shaft 9 serves also as a screw shaft. The guide shaft 9 is rotated by a carriage drive motor 11 which is fixed onto the chassis 1 via a bracket 10. The guide shaft 9 and the output shaft 11a of the motor 11 are drivingly coupled to each other via a gear train configured by a driving gear 12, two intermediate gears 13, and a driven gear 14.

The driving gear 12 is fixed to the output shaft 11a of the motor 11, the intermediate gears 13 are pivotally supported by a movable member which is not shown, and the driven gear 14 is fixed to the guide shaft 9. When the carriage drive motor 11 is activated to repeatedly rotate the guide shaft 9 in forward and reverse, the carriage 3 reciprocates in the anteroposterior direction on the chassis 1 along the guide shafts 8 and 9, so that the objective lens 7 on the carriage 3 radially crosses a disk which is placed on the turn table 2, and which is not shown.

In order to ensure that the carriage 3 is quickly moved, the carriage drive motor 11 is rotated at a high speed of, for example, 12,000 rpm. This causes a problem in that the driving noise produced when the motor operates is bothersome. In order to reduce the driving noise level, the exposed basal portion of the output shaft 11a is directly urged (laterally pressed) by an urging spring in a direction perpendicular to the axial direction of the shaft. When this urging is conducted, the operation noise level in operation of the carriage drive motor 11 can be reduced by several decibels (db) as compared with the case where such urging is not conducted.

Since the exposed basal portion of the output shaft is directly urged by the urging spring, the urging force is large, and hence the load on the output shaft is increased so that the starting voltage is required to be high. This causes a problem in that the carriage cannot be finely motor-controlled at a low voltage.

SUMMARY OF THE INVENTION

In order to solve the problem, it is an object of the invention to provide an urging structure for an output shaft of a drive motor which can prevent an excess load on an output shaft while reducing the driving noise level of a motor, thereby ensuring a starting voltage which is lower than that in a conventional motor.

In order to attain the object, the urging structure for an output shaft of a drive motor according to the invention is a structure which urges an output shaft of a drive motor in one direction to reduce a driving noise level when the drive motor operates, wherein urging means applies a force to an end face of the output shaft of the drive motor, in a direction oblique to an axial direction.

In the thus configured urging structure for an output shaft of a drive motor, since a force is applied to the end face of the output shaft of the drive motor in a direction oblique to the axial direction, an urging force component which urges the output shaft in a radial direction of the shaft can be obtained, and also another urging force component which urges the output shaft in the axial direction can be obtained.

Therefore, an urging force (lateral pressure) is applied to the end face of the output shaft. As compared with the case where the output shaft is directly urged by a force oriented in a radial direction of the output shaft, urging in a radial direction of the output shaft can be conducted while reducing a load of friction braking on the output shaft. Consequently, the driving noise level of the motor can be reduced, and an excess load on the output shaft is prevented from occurring, so that an optimum control is enabled at a lower starting voltage.

Moreover, the urging structure for an output shaft of a drive motor is characterized in that the urging means has: a pressing plate in which a fulcrum is in the vicinity of the output shaft and a free end abuts against the end face of the output shaft; and an urging spring which urges the pressing plate in a direction oblique to the axial direction of the output shaft.

In the thus configured urging structure for an output shaft of a drive motor, the free end of the pressing plate is caused to abut against the end face of the output shaft by the urging force of the urging spring. Therefore, a sure contact with the end face of the output shaft can be ensured by the pressing plate, so that a stable abutting face can be assured. When the urging spring is adequately selected, moreover, the load of a stable urging force can be provided.

Moreover, the urging structure for an output shaft of a drive motor is characterized in that the end face of the output shaft is formed into a spherical shape.

In the thus configured urging structure for an output shaft of a drive motor, the end face is formed into a spherical shape. Even when the pressing plate has a flat structure, therefore, a point contact is formed between the pressing plate and the portion of the output shaft against which the pressing plate abuts, and hence the contact resistance between the pressing plate and the rotated output shaft can be suppressed to a minimum level.

Moreover, the urging structure for an output shaft of a drive motor is characterized in that a cap in which a tip end has a spherical shape is fitted onto the end face of the output shaft to cover the end face.

In the thus configured urging structure for an output shaft of a drive motor, since the cap in which the tip end has a spherical shape is fitted onto the end face to cover it, the length of the exposed portion of the output shaft can be shortened. Furthermore, it is not necessary to process the end face so as to have a spherical shape, and hence the number of processing steps can be reduced.

DETAILED DESCRIPTION OF THE PREFERRED EMBODIMENTS

Hereinafter, an embodiment of the urging structure for an output shaft of a drive motor according to the invention will be described in detail with reference to FIGS. 1 to 5.

Figure 1:
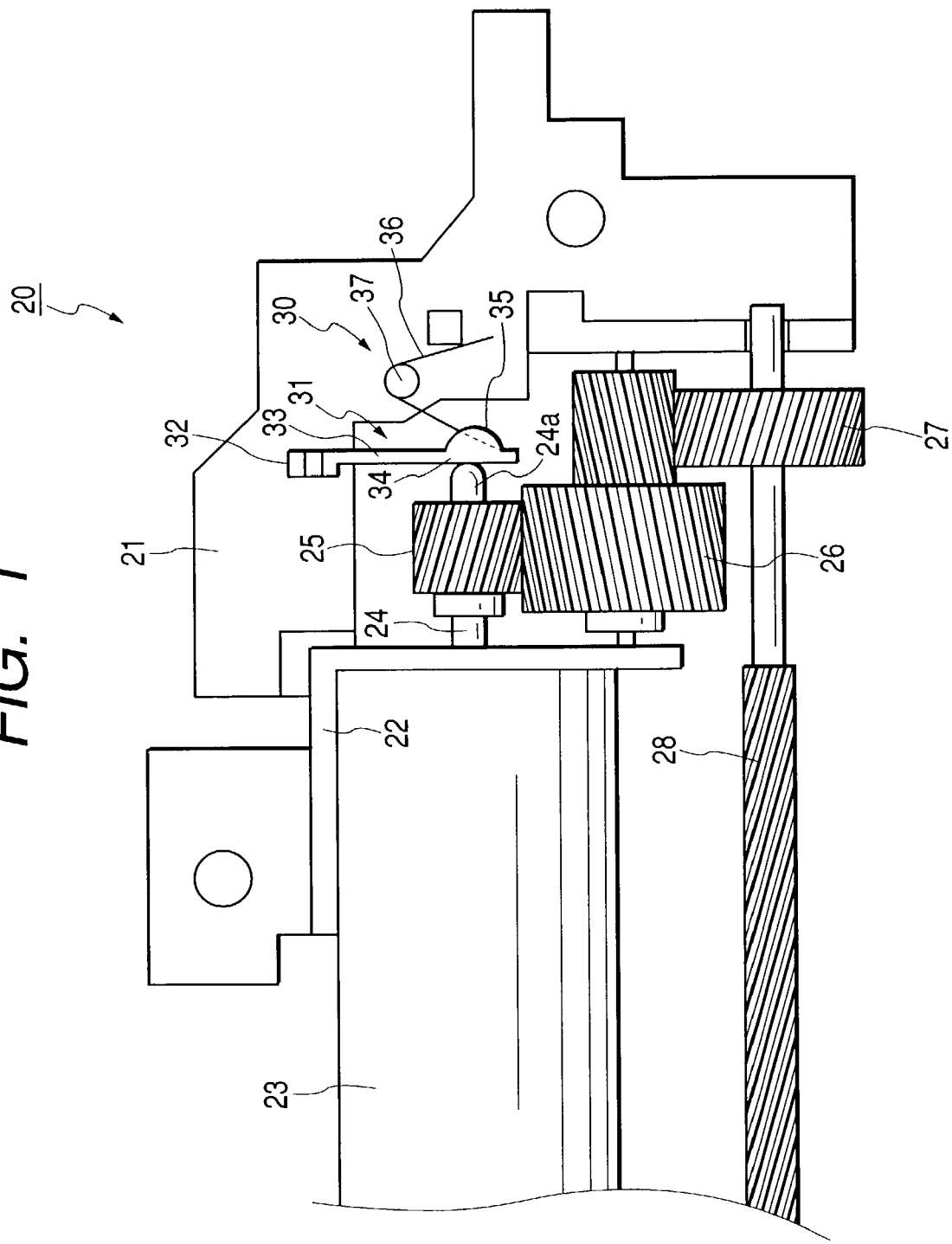
FIG. 1 is a schematic plan view of a chassis peripheral portion of a CD player showing the urging structure for an output shaft of a drive motor according to the invention.
Figure 2:
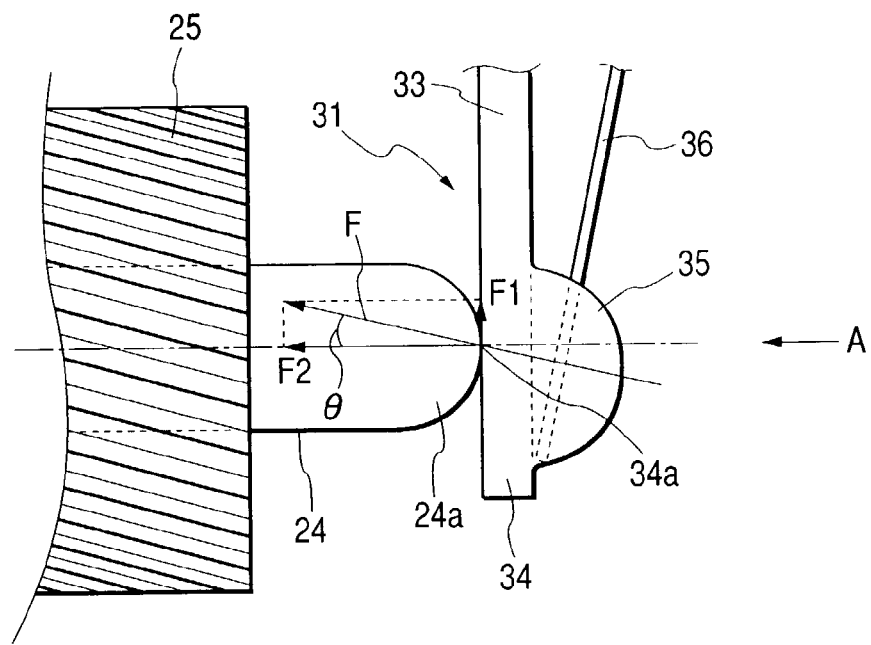
FIG. 2 is a partial enlarged view of main portions of FIG. 1.
Figure 3:
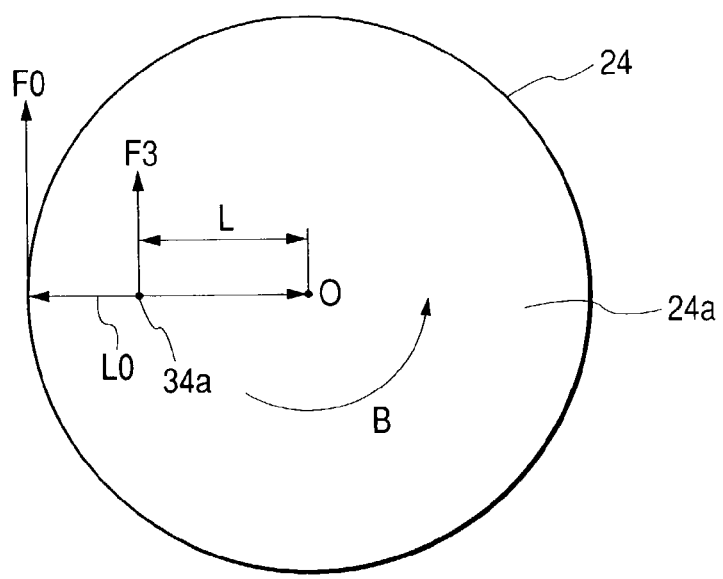
FIG. 3 is a view looking in the direction of the arrow A in FIG. 2.
Figure 4:
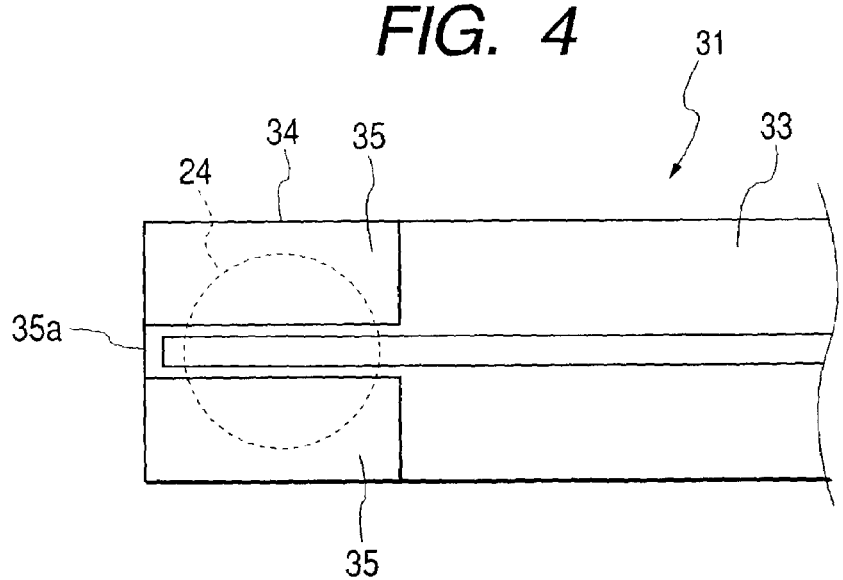
FIG. 4 is a side view showing a free end of a pressing plate in FIG. 2.
Figure 5:
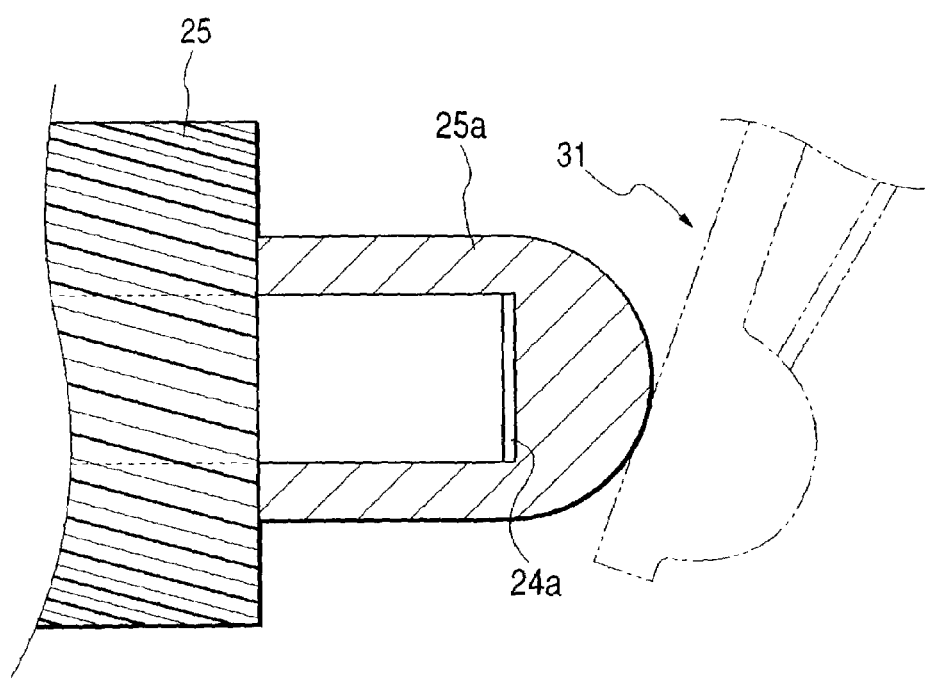
FIG. 5 is a partial enlarged view showing a modification of an end face of an output shaft in FIG. 1.

FIG. 1 is a schematic plan view of a chassis peripheral portion of a CD player showing the urging structure for an output shaft of a drive motor according to the invention, FIG. 2 is a partial enlarged view of main portions of FIG. 1, FIG. 3 is a view looking in the direction of the arrow A in FIG. 2, FIG. 4 is a side view showing a free end of a pressing plate in FIG. 2, and FIG. 5 is a partial enlarged view showing a modification of an end face of an output shaft in FIG. 1.

Detailed description of components which are identical with those of the conventional art will be omitted.

As shown in FIG. 1, in a chassis peripheral portion 20 of a CD player showing the urging structure for an output shaft of a drive motor of the embodiment, a carriage drive motor 23 which is a high-speed (12,000 rpm) motor fixed onto a chassis 21 via a bracket 22 rotates a guide shaft 28 which serves also as a screw shaft.

The guide shaft 28 and the output shaft 24 of the carriage drive motor 23 are drivingly coupled to each other via a gear train configured by a driving gear 25 fixed to the output shaft 24 of the carriage drive motor 23, two intermediate gears 26, and a driven gear 27 fixed to the guide shaft 28.

Figure 6:
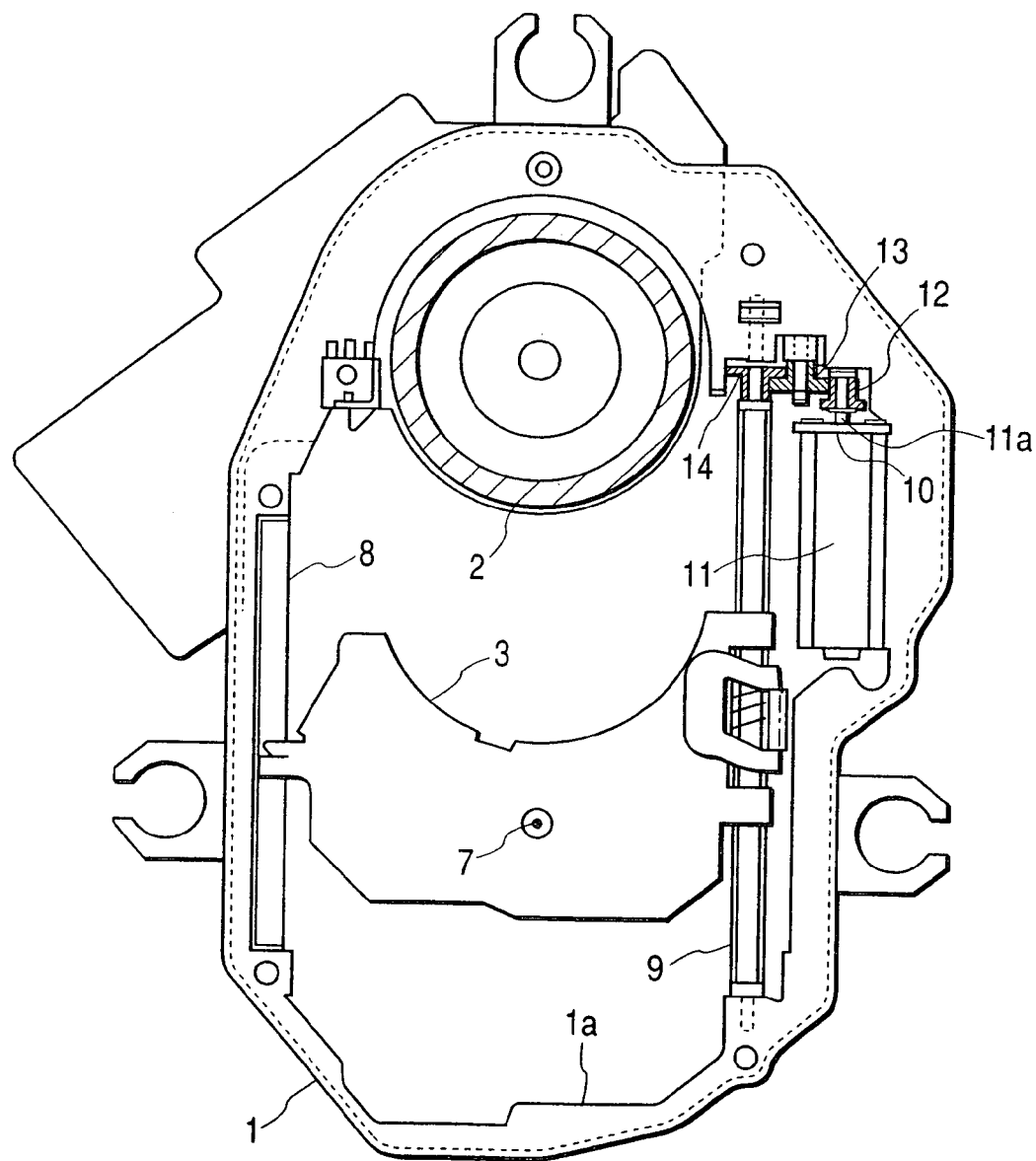
FIG. 6 is a plan view of a chassis peripheral portion of a CD player of a conventional CD player.

When the carriage drive motor 23 is activated to repeatedly rotate the guide shaft 28 in forward and reverse, a carriage (see FIG. 6) which is not shown in the figure reciprocates in the anteroposterior direction (the direction along which the carriage approaches or separates from the turn table) on the chassis 21 along the guide shaft 28.

The urging structure for an output shaft of a drive motor of the embodiment is configured so that the driving noise level when the motor operates is reduced by urging in one direction (laterally pressing) the output shaft 24 of the carriage drive motor 23, and comprises urging means 30 for applying a force to an end face 24a of the output shaft 24 of the carriage drive motor 23, in a direction oblique to the axial direction.

The urging means 30 is configured by a pressing plate 31 which abuts against the end face 24a of the output shaft 24, and an urging spring 36 which urges the pressing plate in the axial direction of the output shaft 24.

The pressing plate 31 is made of a polyacetal resin (POM) which has an excellent bending strength. A fixing portion 32 which serves as a fulcrum in one end is fixed onto the chassis 21 in the vicinity of the output shaft 24. An abutting portion 34 is disposed on the tip end of a flexible arm portion 33.

A spring holding portion 35 with which an end portion of the urging spring 36 that is fixed to a spring boss 37 is to be engaged is disposed on the rear face of the abutting portion 34.

As shown in FIG. 2, the abutting portion 34 of the pressing plate 31 substantially perpendicularly abuts against the end face 24a of the output shaft 24 of the carriage drive motor 23. By means of the urging force of the urging spring 36 which is engaged with the spring holding portion 35 on the rear face of the abutting portion 34, the abutting portion applies a load force F in an oblique direction of an acute angle $\theta$ with respect to the axial direction of the output shaft 24 which is oriented to the motor. As a result, the pressing plate 31 can generate an urging force component F1 which urges the output shaft 24 in a radial direction of the shaft (in the upward direction in the figure) that is perpendicular to the axial direction, and an urging force component F2 which urges the output shaft 24 toward the motor in the axial direction.

Therefore, the output shaft 24 is urged by the urging force component F1 in the perpendicular direction and by the urging force component F2 in the axial direction, whereby stable rotation of the motor is attained, so that the driving noise level of the carriage drive motor 23 can be eliminated.

The end face 24a of the output shaft 24 is formed into a spherical shape.

According to the configuration, the portion abutting against the pressing plate 31 constitutes as a point contact, and hence the contact resistance between the pressing plate and the rotated output shaft 24 can be suppressed to a minimum level.

The contact 34a of the end face 24a of the output shaft 24 with which the pressing plate 31 is contacted functions as a position of the applied force F, and is not required to be on the center axis of the output shaft 24. As far as the contact is inside the radius of the output shaft 24, it is possible to obtain the urging force component F1.

Specifically, in the case where, as shown in FIG. 3, the urging force component F3 acts on the contact 34a of the end face 24a of the output shaft 24 with which the pressing plate 31 is contacted, and which is separated from the shaft center O by a length L, the braking force acting in the rotation direction B of the output shaft 24 is F3×L. Therefore, it will be seen that a braking force acts which is smaller than a braking force (F0×L0) due to a force F0 that directly acts on the outer peripheral face of the output shaft 24 having a radius L0.

As shown in FIG. 4, a spring engagement groove 35a of a width which is slightly larger than the outer diameter of the urging spring 36 is disposed along the longitudinal direction of the arm portion 33, in the holding portion 35 on the rear face of the abutting portion 34 of the pressing plate 31. Therefore, an end portion of the urging spring 36 can be surely engaged with the spring engagement groove 35a, so that a stable urging force in one direction can be applied.

According to the urging structure for an output shaft of a drive motor of the embodiment, the load force F can be applied by the urging spring 36 to the end face 24a of the output shaft 24 in the oblique direction of the angle $\theta$ with respect to the axial direction.

Therefore, an appropriate load can be applied to the output shaft 24 by the urging force component F1 which is a component of the force F in a direction perpendicular to the output shaft 24 (a radial direction of the shaft), so that the output shaft 24 can be urged in a radial direction of the shaft while reducing a load of friction braking on the output shaft 24 as compared with the case where the output shaft is directly urged by a force oriented in a radial direction of the output shaft. Consequently, the driving noise level of the motor can be reduced by about 7 to 10 decibels (db) in comparison with the case where such urging is not conducted, and an optimum control is enabled at a lower starting voltage.

The abutting portion 34 which is the free end of the pressing plate is caused to abut against the end face 24a of the output shaft 24 from the rear face side of the pressing plate 31 by the urging force F of the urging spring 36. Therefore, a sure contact with the end face 24a of the output shaft 24 can be ensured by the pressing plate 31, so that a stable abutting face can be assured. When the urging spring 36 is adequately selected, the load of a stable urging force can be provided.

In the embodiment described above, the end face 24a of the output shaft 24 is formed into a spherical shape and completely exposed. Alternatively, as shown in FIG. 5, the end face may not be exposed and may be covered by a cap 25a which has a spherical tip end, and which is molded integrally with or separately from the driving gear 25. The pressing plate 31 may abut against the cap 25a.

In the alternative, it is not necessary to process the end face 24a so as to have a spherical shape. When the cap 25a is made of the same material as the pressing plate 31, wear of the abutting faces of the two members due to the rotation of the driving gear 25 can be reduced.

In the above, the embodiment in which the invention is applied to a carriage drive motor has been exemplarily described. The invention may be applied also to a motor of another kind such as a turntable motor.

As described above, according to the urging structure for an output shaft of a drive motor of the invention, a force is applied to the end face of the output shaft of the drive motor in a direction oblique to the axial direction, and hence an urging force component which urges the output shaft in one direction can be obtained.

Therefore, an urging force is applied to the end face of the output shaft. As compared with the case where the output shaft is directly urged in one direction, predetermined load can be applied to the output shaft by a small urging force. Consequently, the driving noise level of the motor can be reduced, and an excess load on the output shaft is prevented from occurring, so that an optimum starting voltage is ensured.

In the urging structure for an output shaft of a drive motor, since the free end of the pressing plate is caused to abut against the end face of the output shaft by the urging force of the urging spring, a stable abutting face can be ensured, and the load of a stable urging force can be provided in a predetermined direction from the rear face side of the pressing plate.

In the urging structure for an output shaft of a drive motor, since the end face of the output shaft is formed into a spherical shape, a point contact is formed between the pressing plate and the end face, and hence the contact resistance between the pressing plate and the rotated output shaft can be suppressed to a minimum level.

What is claimed is:

1. An urging structure for an output shaft of a drive motor which urges an output shaft of a drive motor in one direction to reduce a driving noise level when said drive motor operates, said structure comprising:
    a pressing plate having a fulcrum end and a free end, wherein the free end abuts an end face of the output shaft; and
    an urging spring which urges the pressing plate in a direction oblique to an axial direction of the output shaft;
    wherein the urging spring urges the pressing plate, thereby applying a force oblique to the axial direction of the output shaft to the output shaft;
    wherein the pressing plate has a first face, directly abutting the output shaft, and a second face, opposite to the first face, abutting the urging spring; and
    wherein the urging spring exerts a force on the second face of the pressing plate, such that the first face of the pressing plate exerts an oblique force on the output shaft.

2. The urging structure for an output shaft of a drive motor according to claim 1, wherein said end face of said output shaft is formed into a spherical shape.

3. An urging structure for an output shaft of a drive motor which urges an output shaft of a drive motor in one direction to reduce a driving noise level when the drive motor operates, the structure comprising:
    a cap, having a spherical tip end which is fitted onto an end face of the output shaft, thereby covering the end face of the output shaft;
    a pressing plate having; and
    an urging spring;
    wherein the pressing plate has a first face, directly abutting the cap, and a second face, opposite to the first face, which abuts the urging spring; and
    wherein the urging spring exerts a force, on the second face of the pressing plate, such that the first face of the pressing plate exerts an oblique force on the output shaft via the cap.

* * * * *